US009365701B2

(12) United States Patent
Nick et al.

(10) Patent No.: US 9,365,701 B2
(45) Date of Patent: Jun. 14, 2016

(54) PARTICLES INCLUDING NANOPARTICLES, USES THEREOF, AND METHODS

(75) Inventors: Robert J. Nick, Pepperell, MA (US); John R. Linton, Concord, MA (US)

(73) Assignee: QD VISION, INC., Lexington, MA (US)

(*) Notice: Subject to any disclaimer, the term of this patent is extended or adjusted under 35 U.S.C. 154(b) by 0 days.

(21) Appl. No.: 13/414,417

(22) Filed: Mar. 7, 2012

(65) Prior Publication Data

US 2012/0256141 A1   Oct. 11, 2012

Related U.S. Application Data

(63) Continuation of application No. PCT/US2010/048285, filed on Sep. 9, 2010.

(60) Provisional application No. 61/240,932, filed on Sep. 9, 2009.

(51) Int. Cl.
| | |
|---|---|
| *C08K 9/10* | (2006.01) |
| *C09K 11/02* | (2006.01) |
| *C09K 11/56* | (2006.01) |
| *C09K 11/70* | (2006.01) |
| *C09D 5/22* | (2006.01) |

(52) U.S. Cl.
CPC ... *C08K 9/10* (2013.01); *C09D 5/22* (2013.01); *C09K 11/02* (2013.01); *C09K 11/025* (2013.01); *C09K 11/565* (2013.01); *C09K 11/70* (2013.01)

(58) Field of Classification Search
CPC ............. H01B 1/12; C09D 5/22; B82Y 30/00
USPC ...................................... 523/210; 252/301.36
See application file for complete search history.

(56) References Cited

U.S. PATENT DOCUMENTS

| | | | |
|---|---|---|---|
| 3,872,040 | A | 3/1975 | Mollohan et al. |
| 4,738,798 | A | 4/1988 | Mahler |
| 5,064,718 | A | 11/1991 | Buscall et al. |
| 5,091,115 | A | 2/1992 | Nogami |
| 5,300,538 | A | 4/1994 | Loftin |
| 5,356,617 | A | 10/1994 | Schlossman |
| 5,422,489 | A | 6/1995 | Bhargava |
| 5,434,878 | A | 7/1995 | Lawandy |
| 5,442,254 | A | 8/1995 | Jaskie |
| 5,448,582 | A | 9/1995 | Lawandy |
| 5,464,696 | A | 11/1995 | Tournier et al. |
| 5,470,910 | A | 11/1995 | Spanhel |
| 5,527,386 | A | 6/1996 | Statz |
| 5,751,018 | A | 5/1998 | Alivisato et al. |
| 5,906,670 | A | 5/1999 | Dobson et al. |
| 6,023,371 | A | 2/2000 | Onitsuka et al. |
| 6,103,379 | A | 8/2000 | Margel et al. |
| 6,251,303 | B1 | 6/2001 | Bawendi et al. |
| 6,259,506 | B1 | 7/2001 | Lawandy |
| 6,309,701 | B1 | 10/2001 | Barbera-Guillem et al. |
| 6,322,901 | B1 | 11/2001 | Bawendi et al. |
| 6,358,652 | B1 | 3/2002 | Tomiuchi et al. |
| 6,391,406 | B1 | 5/2002 | Zenner et al. |
| 6,464,898 | B1 | 10/2002 | Tomoike et al. |
| 6,501,091 | B1 | 12/2002 | Bawendi et al. |
| 6,528,165 | B2 | 3/2003 | Chandler |
| 6,548,171 | B1 | 4/2003 | Barbera-Guillem et al. |
| 6,552,290 | B1 | 4/2003 | Lawandy |
| 6,576,155 | B1 | 6/2003 | Barbera-Guillem |
| 6,602,671 | B1 | 8/2003 | Bawendi et al. |
| 6,633,370 | B2 | 10/2003 | Lawandy |
| 6,652,967 | B2 | 11/2003 | Yadav et al. |
| 6,660,381 | B2 | 12/2003 | Halas et al. |
| 6,680,211 | B2 | 1/2004 | Barbera-Guillem et al. |
| 6,703,781 | B2 | 3/2004 | Zovko |
| 6,721,083 | B2 | 4/2004 | Jacobson et al. |
| 6,726,992 | B1 | 4/2004 | Yadav et al. |

(Continued)

FOREIGN PATENT DOCUMENTS

| | | |
|---|---|---|
| CN | 101522557 | 9/2009 |
| JP | H0950057 | 2/1997 |
| JP | 2008528722 | 7/2008 |
| WO | WO03060142 A2 | 7/2003 |
| WO | WO2006077256 A1 | 7/2006 |
| WO | WO2007095173 A2 | 8/2007 |
| WO | WO2008063652 A1 | 5/2008 |
| WO | WO2009002512 A1 | 12/2008 |
| WO | WO2009014590 A3 | 1/2009 |
| WO | WO2009014590 A9 | 1/2009 |
| WO | WO2009145813 A1 | 12/2009 |
| WO | WO2011031871 A1 | 3/2011 |
| WO | WO2011031876 A1 | 3/2011 |

OTHER PUBLICATIONS

Boev, V.I., et al., "Incorporation of CdS nanoparticles from colloidal solution into optically clear ureasilicate matrix with preservation of quantum size effect", Solid State Sciences, vol. 8, (2006) pp. 50-58.

Budriene, S., et al., "Preparation of Lipophillic Dye-Loaded (Vinyl Alcohol) Microcapsules and Their Characteristics", Chemija (Vilnius), 2002, T. 13, Nr. 2, 103-106.

Cameron, N. R., et al., "Non-Aqueous High Internal Phase Emulsions Preparation and Stability", J. Chem. Soc., Faraday Trans., 1996, 92(9), pp. 1543-1547.

(Continued)

*Primary Examiner* — Edward Cain

(57) ABSTRACT

A particle comprising nanoparticles encapsulated within a host material is disclosed, wherein the particle includes a coating disposed over at least a portion of the outer surface of the particle. In certain embodiments, nanoparticles have light-emissive properties. In certain embodiments, the coating covers all or substantially all of the outer surface of the particle. The coating can comprise a resin having low oxygen permeability. In certain embodiments, the coating comprises a polyvinyl alcohol compound. In certain embodiments, the coating comprises a polyvinylidene dichloride compound. Other embodiments relate to a powder comprising a particle of the invention, a composition including a particle of the invention, a formulation including a particle of the invention, a coating comprising a particle of the invention, a method for making a particle of the invention, and products and applications including a particle of the invention. In preferred embodiments, a nanoparticle comprises a semiconductor nanocrystal.

40 Claims, 2 Drawing Sheets

(56) References Cited

U.S. PATENT DOCUMENTS

| | | |
|---|---|---|
| 6,731,359 B1 | 5/2004 | Fukaya |
| 6,773,812 B2 | 8/2004 | Chandler et al. |
| 6,783,569 B2 | 8/2004 | Cheon et al. |
| 6,791,259 B1 | 9/2004 | Stokes et al. |
| 6,814,760 B2 | 11/2004 | Anderson et al. |
| 6,819,845 B2 | 11/2004 | Lee et al. |
| 6,835,326 B2 | 12/2004 | Barbera-Guillem |
| 6,870,311 B2 | 3/2005 | Mueller et al. |
| 6,876,796 B2 | 4/2005 | Garito et al. |
| 6,899,827 B2 | 5/2005 | Lauf et al. |
| 6,905,766 B2 | 6/2005 | Chandler |
| 6,906,339 B2 | 6/2005 | Dutta |
| 6,914,106 B2 | 7/2005 | Leon et al. |
| 6,924,596 B2 | 8/2005 | Sato et al. |
| 6,957,608 B1 | 10/2005 | Hubert et al. |
| 7,008,559 B2 | 3/2006 | Chen |
| 7,032,664 B2 | 4/2006 | Lord et al. |
| 7,045,956 B2 | 5/2006 | Braune et al. |
| 7,065,285 B2 | 6/2006 | Chen et al. |
| 7,073,965 B2 | 7/2006 | Look |
| 7,083,889 B2 | 8/2006 | Yamazaki et al. |
| 7,102,152 B2 | 9/2006 | Chua et al. |
| 7,115,216 B2 | 10/2006 | Carter et al. |
| 7,115,688 B1 | 10/2006 | Mirkin et al. |
| 7,160,613 B2 | 1/2007 | Bawendi |
| 7,182,938 B2 | 2/2007 | Andre et al. |
| 7,205,048 B2 | 4/2007 | Naasani |
| 7,208,122 B2 | 4/2007 | Swager et al. |
| 7,229,690 B2 | 6/2007 | Chan et al. |
| 7,265,488 B2 | 9/2007 | Ng et al. |
| 7,279,832 B2 | 10/2007 | Thurk et al. |
| 7,316,809 B2 | 1/2008 | L'Alloret |
| 7,326,365 B2 | 2/2008 | Bawendi et al. |
| 7,374,807 B2 | 5/2008 | Parce et al. |
| 7,449,237 B2 | 11/2008 | Chan et al. |
| 7,470,731 B2 | 12/2008 | Sanchez et al. |
| 7,479,516 B2 | 1/2009 | Chen et al. |
| 7,495,383 B2 | 2/2009 | Chua et al. |
| 7,534,489 B2 | 5/2009 | Ying et al. |
| 7,553,683 B2 | 6/2009 | Martin et al. |
| 7,625,501 B2 | 12/2009 | Yang et al. |
| 7,659,224 B2 | 2/2010 | Shimazaki et al. |
| 7,671,096 B2 | 3/2010 | Hosaka et al. |
| 7,674,844 B2 | 3/2010 | Pickett et al. |
| 7,709,544 B2 | 5/2010 | Doyle et al. |
| 7,723,394 B2 | 5/2010 | Klimov et al. |
| 7,723,744 B2 | 5/2010 | Gillies et al. |
| 7,732,806 B2 | 6/2010 | Yoshimura et al. |
| 7,767,017 B2 | 8/2010 | Lahann et al. |
| 7,811,470 B2 | 10/2010 | Hayes et al. |
| 7,824,731 B2 | 11/2010 | Ying et al. |
| 7,829,162 B2 | 11/2010 | Eskra |
| 7,857,141 B2 | 12/2010 | Park et al. |
| 7,862,892 B2 | 1/2011 | Chan et al. |
| 7,867,413 B2 | 1/2011 | Lee et al. |
| 7,917,298 B1 | 3/2011 | Scher et al. |
| 8,128,249 B2 | 3/2012 | Skipor et al. |
| 8,257,785 B2 | 9/2012 | Goh et al. |
| 8,354,785 B2 | 1/2013 | Clough et al. |
| 8,377,333 B2 | 2/2013 | Ramprasad et al. |
| 8,404,347 B2 * | 3/2013 | Li et al. .......... 428/407 |
| 8,405,063 B2 | 3/2013 | Kazlas et al. |
| 8,420,155 B2 | 4/2013 | Nie et al. |
| 8,427,855 B2 | 4/2013 | Jang et al. |
| 8,440,229 B2 | 5/2013 | Trogler et al. |
| 8,470,617 B2 | 6/2013 | Coe-Sullivan et al. |
| 8,718,437 B2 | 5/2014 | Coe-Sullivan et al. |
| 8,957,401 B2 | 2/2015 | Pickett et al. |
| 2001/0034034 A1 | 10/2001 | Bruchez et al. |
| 2002/0071948 A1 | 6/2002 | Duff et al. |
| 2002/0098217 A1 | 7/2002 | Piot et al. |
| 2002/0157574 A1 | 10/2002 | Weitzel et al. |
| 2002/0186921 A1 | 12/2002 | Schumacher et al. |
| 2003/0030706 A1 | 2/2003 | Jagannathan et al. |
| 2003/0031438 A1 | 2/2003 | Kambe et al. |
| 2003/0048346 A1 | 3/2003 | Chow |
| 2003/0082237 A1 | 5/2003 | Cha et al. |
| 2003/0106160 A1 | 6/2003 | Sun et al. |
| 2003/0132538 A1 | 7/2003 | Chandler |
| 2003/0151700 A1 | 8/2003 | Carter et al. |
| 2003/0175411 A1 | 9/2003 | Kodas et al. |
| 2004/0007169 A1 | 1/2004 | Ohtsu et al. |
| 2004/0095658 A1 | 5/2004 | Buretea et al. |
| 2004/0131789 A1 | 7/2004 | Brown |
| 2004/0201664 A1 | 10/2004 | Bringley et al. |
| 2005/0012076 A1 | 1/2005 | Morioka |
| 2005/0058416 A1 | 3/2005 | Hoon Lee et al. |
| 2005/0068154 A1 | 3/2005 | Beste et al. |
| 2005/0100807 A1 | 5/2005 | Yamazaki et al. |
| 2005/0112376 A1 | 5/2005 | Naasani |
| 2005/0117868 A1 | 6/2005 | Chen et al. |
| 2005/0126628 A1 | 6/2005 | Scher et al. |
| 2005/0214967 A1 | 9/2005 | Scher et al. |
| 2005/0218377 A1 | 10/2005 | Lawandy |
| 2005/0266246 A1 | 12/2005 | Reiss et al. |
| 2005/0272159 A1 | 12/2005 | Ismagilov et al. |
| 2005/0287348 A1 | 12/2005 | Faler et al. |
| 2006/0002875 A1 | 1/2006 | Winkler et al. |
| 2006/0003097 A1 | 1/2006 | Andres et al. |
| 2006/0003114 A1 | 1/2006 | Enlow et al. |
| 2006/0038182 A1 | 2/2006 | Rogers et al. |
| 2006/0057480 A1 | 3/2006 | Lin et al. |
| 2006/0060862 A1 | 3/2006 | Bawendi et al. |
| 2006/0068154 A1 | 3/2006 | Parce et al. |
| 2006/0081862 A1 | 4/2006 | Chua et al. |
| 2006/0083694 A1 | 4/2006 | Kodas et al. |
| 2006/0128845 A1 | 6/2006 | Emrick et al. |
| 2006/0157686 A1 | 7/2006 | Jang et al. |
| 2006/0165621 A1 | 7/2006 | Dubertret et al. |
| 2006/0167147 A1 | 7/2006 | Asgari |
| 2006/0196375 A1 | 9/2006 | Coe-Sullivan et al. |
| 2006/0199886 A1 | 9/2006 | Ryang |
| 2006/0215958 A1 | 9/2006 | Yeo et al. |
| 2006/0216508 A1 | 9/2006 | Denisyuk et al. |
| 2006/0221021 A1 | 10/2006 | Hajjar et al. |
| 2006/0240258 A1 | 10/2006 | Sato et al. |
| 2006/0257637 A1 | 11/2006 | Pereira et al. |
| 2006/0287437 A1 | 12/2006 | Ma et al. |
| 2006/0293409 A1 | 12/2006 | Sanchez et al. |
| 2007/0012928 A1 | 1/2007 | Peng et al. |
| 2007/0014318 A1 | 1/2007 | Hajjar et al. |
| 2007/0034833 A1 | 2/2007 | Parce et al. |
| 2007/0036962 A1 | 2/2007 | Sasaki et al. |
| 2007/0045777 A1 | 3/2007 | Gillies et al. |
| 2007/0063154 A1 | 3/2007 | Chen et al. |
| 2007/0087187 A1 | 4/2007 | Lu et al. |
| 2007/0090755 A1 | 4/2007 | Eida et al. |
| 2007/0112101 A1 | 5/2007 | Choi et al. |
| 2007/0121129 A1 | 5/2007 | Eida et al. |
| 2007/0158611 A1 | 7/2007 | Oldenburg et al. |
| 2007/0161043 A1 | 7/2007 | Nie et al. |
| 2007/0164661 A1 | 7/2007 | Kuma |
| 2007/0197003 A1 | 8/2007 | Yen et al. |
| 2007/0201056 A1 | 8/2007 | Cok et al. |
| 2007/0207186 A1 | 9/2007 | Scanlon et al. |
| 2007/0241661 A1 | 10/2007 | Yin |
| 2007/0265379 A1 | 11/2007 | Chen et al. |
| 2007/0269518 A1 | 11/2007 | Walline et al. |
| 2007/0281140 A1 | 12/2007 | Haubrich et al. |
| 2007/0290384 A1 | 12/2007 | Kodas et al. |
| 2008/0001124 A1 | 1/2008 | Hachiya et al. |
| 2008/0011956 A1 | 1/2008 | Burrell et al. |
| 2008/0029625 A1 | 2/2008 | Talton et al. |
| 2008/0029710 A1 | 2/2008 | Sekiya et al. |
| 2008/0044746 A1 | 2/2008 | Anderson et al. |
| 2008/0070153 A1 | 3/2008 | Ioku et al. |
| 2008/0087190 A1 | 4/2008 | Iftime et al. |
| 2008/0090928 A1 | 4/2008 | Iftime et al. |
| 2008/0103250 A1 | 5/2008 | Carlini et al. |
| 2008/0115722 A1 | 5/2008 | Yen et al. |
| 2008/0121844 A1 | 5/2008 | Jang et al. |
| 2008/0165235 A1 | 7/2008 | Rolly et al. |
| 2008/0166557 A1 | 7/2008 | Bayless |
| 2008/0169753 A1 | 7/2008 | Skipor et al. |

(56) References Cited

U.S. PATENT DOCUMENTS

| | | |
|---|---|---|
| 2008/0173886 A1 | 7/2008 | Cheon et al. |
| 2008/0230750 A1 | 9/2008 | Gillies et al. |
| 2008/0237540 A1 | 10/2008 | Dubrow |
| 2008/0246017 A1 | 10/2008 | Gillies et al. |
| 2008/0254920 A1 | 10/2008 | Oresky |
| 2008/0268249 A1 | 10/2008 | Araki et al. |
| 2008/0277626 A1 | 11/2008 | Yang et al. |
| 2009/0014685 A1 | 1/2009 | Justel et al. |
| 2009/0017268 A1 | 1/2009 | Skipor et al. |
| 2009/0021148 A1 | 1/2009 | Hachiya et al. |
| 2009/0036554 A1 | 2/2009 | Burke |
| 2009/0059554 A1 | 3/2009 | Skipor et al. |
| 2009/0097898 A1 | 4/2009 | Iftime et al. |
| 2009/0143227 A1 | 6/2009 | Dubrow et al. |
| 2009/0152567 A1 | 6/2009 | Comerford et al. |
| 2009/0162011 A1 | 6/2009 | Coe-Sullivan et al. |
| 2009/0215208 A1 | 8/2009 | Coe-Sullivan et al. |
| 2009/0278141 A1 | 11/2009 | Coe-Sullivan et al. |
| 2009/0311336 A1 | 12/2009 | Jones |
| 2009/0324835 A1 | 12/2009 | Bonda et al. |
| 2010/0044635 A1 | 2/2010 | Breen et al. |
| 2010/0051870 A1 | 3/2010 | Ramprasad |
| 2010/0051898 A1 | 3/2010 | Kim et al. |
| 2010/0051901 A1 | 3/2010 | Kazlas et al. |
| 2010/0052512 A1 | 3/2010 | Clough et al. |
| 2010/0056485 A1 | 3/2010 | Park |
| 2010/0063201 A1 | 3/2010 | Yamamoto et al. |
| 2010/0068468 A1 | 3/2010 | Coe-Sullivan et al. |
| 2010/0113813 A1 | 5/2010 | Pickett et al. |
| 2010/0123155 A1 | 5/2010 | Pickett et al. |
| 2010/0167011 A1 | 7/2010 | Dubrow |
| 2010/0264371 A1 | 10/2010 | Nick |
| 2010/0265307 A1 | 10/2010 | Linton et al. |
| 2010/0275807 A1 | 11/2010 | Landry et al. |
| 2010/0283014 A1 | 11/2010 | Breen et al. |
| 2011/0081538 A1 | 4/2011 | Linton et al. |
| 2011/0089375 A1 | 4/2011 | Chan et al. |
| 2011/0175250 A1 | 7/2011 | Yoon |
| 2011/0241229 A1 | 10/2011 | Naasani et al. |
| 2011/0245533 A1 | 10/2011 | Breen et al. |
| 2012/0141774 A1 | 6/2012 | Abrami et al. |
| 2012/0256134 A1 | 10/2012 | Nick |
| 2013/0075014 A1 | 3/2013 | Dubrow |

OTHER PUBLICATIONS

Crespy, D., et al., "Making dry fertile: a practical tour of non-aqueous emulsions miniemulsions, their preparation and some applications", Soft Matter, 2011, 7, pp. 11054-11064.

Dabbousi, B.O., et al., "(CdSe)ZnS Core—Shell Quantum Dots: Synthesis and Characterization of a Size Series of Highly Luminescent Nanocrystallites", J. Phys. Chem B. 101, pp. 9463-9475 (1997).

de Mello, J.C., et al., "An Improved Experimental Determination of External Photoluminescence Quantum Efficiency", Advanced Materials 9 (3) pp. 230-232 (1997).

Dubertret, B., et al., "In vivo Imaging of Quantum Dots Encapsulated in Phospholipid Micelles", Science vol. 298, Nov. 2002 (pp. 1759-1762).

Garner, B., et al., "Electric Field Enhanced Photoluminescence of CdTe Quantum Dots Encapsulated in Poly (N-Isopropylacrylamide) Nano-Spheres", Optics Express vol. 16, No. 24, 19410-19418 (2008).

Iwamoto, M., et al., "Production of Gold Nanoparticles-Polymer Composite by Quite Simple Method", Eur. Phys. J.D. 24, 365-367 (2003).

Kim, S., et al., "Oligomeric Ligands for Luminescent and Stable Nanocrystal Quantum Dots", J. Am. Chem. Soc., 2003, 125, pp. 14652-14653.

Klepper, M., et al., "Oil-in-Oil Emulsions: A Unique Tool for the Formation of Polymer Nanoparticles", Accounts of Chemical Research 2008, vol. 41, No. 9, pp. 1190-1201.

Lee, J., et al., "Full Color Emission from II-VI Semiconductor Quantum Dot-Polymer Composites", Advanced Materials, 2000, 12, No. 15, Aug. 2.

Murray, C.B., "Synthesis and Characterization of II-VI Quantum Dots and Their Assembly into 3-D Quantum Dot Superlattices", Massachusetts Institute of Technology, Thesis, Sep., 1995.

Murray, C.B., et al., "Synthesis and Characterization of Nearly Monodisperse CdE (E = S, Se, Te) Semiconductor Nanocrystallites", J. Am. Chem. Soc., 115:8706 (1993).

Nikolic, M., Dissertation entitled Encapsulation of Nanoparticles within Poly(ethylene oxide) Shell, University of Hamburg 2007.

Office Action (first) dated Jun. 3, 2013 in counterpart Chinese Patent Application No. 2010-80040045.1 (Chinese language).

Office Action (first) dated Jun. 3, 2013 in counterpart Chinese Patent Application No. 2010-80040045.1, 13 (English language).

Office Action (first) dated Mar. 4, 2014 in counterpart Japanese Patent Application No. 2012-528899 (Engl. Transl.).

Office Action (first) dated Mar. 4, 2014 in counterpart Japanese Patent Application No. 2012-528899 (Japanese).

Office Action (Nonfinal) mailed May 30, 2014 in copending U.S. Appl. No. 12/874,357.

Office Action (second) & Search Report dated Apr. 28, 2014 in counterpart Chinese Patent Application No. 2010-800400451 (Chinese).

Office Action (second) & Search Report dated Apr. 28, 2014 in counterpart Chinese Patent Application No. 2010-800400451 (Engl. Transl.).

PCT International Search Report and Written Opinion mailed Nov. 8, 2010 in International Application No. PCT/US2010/048285 of QD Vision, Inc.

PCT International Search Report and Written Opinion mailed Oct. 22, 2010 in International Application No. PCT/US2010/48291 of QD Vision, Inc.

Peter, W., et al., "Advancements in Novel Encapsulated Light Stabilizers for Coatings", PCIMAG.com, Aug. 2008, p. 44.

Petersen, R.V., et al., "Studies on Nonaqueous Emulsions", J. Soc. Cosmetic Chemists, 19, (1968), pp. 627-640.

Sakthivel, T., et al., "Non-aqueous emulsions: hydrocarbon-formamide systems", International Journal of Pharmaceutics, 214 (2001), pp. 43-48.

Sheng, W., et al., "In-Situ Encapsulation of Quantum Dots into Polymer Microspheres", Langmuir 2006, vol. 22, pp. 3782-3790.

Shojaei-Zadeh, S., et al., "Encapsulation of Multicolored Quantum Dots in Polystyrene Beads Using Microfluidic Devices", American Institute of Chemical Engineers, 2008 Annual Meeting—Conference Proceedings, Engineering Sciences and Fundamentals.

Thomas, V., et al., "Review on Polymer, Hydrogel and Microgel Metal Nanocomposites: A facile Nanotechnological Approach", Journal of Macromolecular Science, (2008) 45, 107-119.

Wang, D., et al., "Composite Photonic Crystals from Semiconductor Nanocrystal/Polyelectrolyte-Coated Colloidal Spheres", Chem. Mater., 15 (2003), pp. 2724-2729.

Ye, Xinyu, et al., "Zinc Sulfide Nanocrystals in Paraffin Liquid Open to Air: Preparation, Structure, and Mechanism", Chemistry Letters vol. 36, No. 11 (2007) 1376-1377.

Zwiller, V., et al., Quantum Optics With Single Quantum Dot Devices, New Journal of Physics, 6 (2004) 96.

Machol, J.L., et al., "Optical studies of IV-VI quantum dots", *Physica A* vol. 207 (1994), pp. 427-434.

European Supplemental Search Report mailed Dec. 8, 2014 in counterpart European Patent Application No. 10 816 085.4.

\* cited by examiner

PARTICLES INCLUDING NANOPARTICLES, USES THEREOF, AND METHODS

This application is a continuation of commonly owned International Application No. PCT/US2010/048285 filed 9 Sep. 2010, which was published in the English language as PCT Publication No. WO 2011/031871 A1 on 17 Mar. 2011, which International Application claims priority to U.S. Application No. 61/240,932 filed 9 Sep. 2009. Each of the foregoing is hereby incorporated herein by reference in its entirety.

FEDERALLY SPONSORED RESEARCH OR DEVELOPMENT

This invention was made with Government support under Contract No. 2004*H838109*000 awarded by the Central Intelligence Agency. The Government has certain rights in the invention.

TECHNICAL FIELD OF THE INVENTION

The present invention relates to the technical field of nanotechnology.

SUMMARY OF THE INVENTION

More particularly, the present invention relates to a particle comprising nanoparticles included within a host material, wherein the particle includes a coating over at least a portion of the outer surface of the particle. The present invention also relates to powders, formulations, compositions, films, and coatings including same, uses thereof; and methods.

In accordance with one aspect of the present invention there is provided a particle comprising nanoparticles included in a host material, wherein the particle includes a coating over at least a portion of the outer surface of the particle.

In certain embodiments, the nanoparticles have light-emissive properties.

Preferably the coating covers all or substantially all of the outer surface of the particle.

The coating preferably comprises a coating material comprising a resin having low oxygen permeability.

Examples of such resins include, but are not limited to, a polyvinyl alcohol compound and a polyvinylidene dichloride compound.

Such resin can be substituted or unsubstituted.

In certain embodiments, the coating comprises a polyvinyl alcohol compound.

The polyvinyl alcohol compound can optionally include one or more substituent groups, which can be the same or different.

In certain embodiments, the polyvinyl alcohol compound comprises polyvinyl alcohol (PVA).

The polyvinyl alcohol can optionally include one or more substituent groups, which can be the same or different.

In certain embodiments, the polyvinyl alcohol compound comprises poly (ethylenevinyl) alcohol (EVA).

The poly (ethylenevinyl) alcohol can optionally include one or more substituent groups, which can be the same or different.

In certain embodiments, the coating comprises polyvinylidene dichloride.

The polyvinylidene dichloride can optionally include one or more substituent groups, which can be the same or different.

In certain embodiments, the particle has at least one dimension in the range from about 0.01 µm to about 100 µm. In certain embodiments, the particle has at least one dimension in the range from about 0.01 µm to about 75 µm. In certain embodiments, the particle has at least one dimension in the range from about 0.01 µm to about 50 µm. In certain embodiments, the particle has at least one dimension in the range from about 0.01 µm to about 25 µm. Other particle sizes may be useful or desirable.

The concentration of nanoparticles in the host material or particle can be varied. In certain embodiments, the nanoparticles can be included in the host material in an amount of at least about 0.001 weight percent. In certain embodiments, the nanoparticles can be included in the host material in an amount in a range from about 0.001 to about 25 weight percent. In certain embodiments, the nanoparticles can be included in the host material in an amount in a range from about 0.001 to about 20 weight percent. In certain embodiments, the nanoparticles can be included in the host material in an amount in a range from about 0.001 to about 15 weight percent. In certain embodiments, the nanoparticles can be included in the host material in an amount in a range from about 0.001 to about 10 weight percent. In certain embodiments, the nanoparticles can be included in the host material in an amount in a range from about 0.001 to about 5 weight percent. In certain embodiments, the nanoparticles can be included in the host material in an amount in a range from about 0.001 to about 2.5 weight percent. In certain embodiments, the nanoparticles can be included in the host material in an amount in a range from about 0.01 to about 2 weight percent. Other concentrations of nanoparticles in the host material may be determined to be useful or desirable.

The weight percent of the nanoparticles included in a particle is determined based on the weight of the nanoparticles without regard to any ligand(s) that may be attached thereto.

In certain embodiments, the host material comprises a polymer.

In certain preferred embodiments, the host material comprises a polyacrylate.

In certain embodiments, the host material comprises a polymethacrylate.

In certain embodiments, the host material comprises a polylaurylmethacrylate.

In certain embodiments, the host material comprises a monomer.

In certain embodiments, the host material comprises a resin.

In certain embodiments, the host material comprises one or more monomers, polymers, and/or resins.

Examples of polymers and resins include, for example and without limitation, polyethylene, polypropylene, polystyrene, polyethylene oxide, polysiloxane, polyphenylene, polythiophene, poly (phenylene-vinylene), polysilane, polyethylene terephthalate and poly (phenylene-ethynylene), polymethylmethacrylate, polylaurylmethacrylate, polycarbonate, epoxy, and other epoxies.

Other polymers and resins can be readily ascertained by one of ordinary skill in the relevant art.

Examples of monomers include, for example and without limitation, monomer precursors for the above listed polymer examples and other examples described herein.

In certain embodiments, the host material comprises a mixture including one or more monomers, polymers, and/or resins.

In certain embodiments, the host material comprises an inorganic material, such as metal oxide (including, but not limited to, silica or titanic).

In certain embodiments, the host material comprises a solid wax.

In certain embodiments, the host material comprises a semi-solid wax.

In certain embodiments, the host material comprises a mixture of waxes.

In certain embodiments, the wax is non-biodegradable.

In certain embodiments, the host material is optically transparent.

In certain embodiments, the host material is optically transparent to excitation light used to optically excite the nanoparticles.

In certain embodiments, the host material is optically transparent to light emitted from the light-emissive nanoparticles.

In certain embodiments, the host material is optically transparent to both the excitation light and light emitted from the light-emissive nanoparticles, Nanoparticles with light-emissive properties are discussed below.

In certain embodiments, at least a portion of the nanoparticles include a core comprising a first semiconductor material and a shell disposed over at least a portion of an outer surface of the core, the shell comprising a second semiconductor material.

In certain embodiments, at least a portion of the nanoparticles includes one or more ligands attached to an outer surface thereof.

In certain embodiments wherein at least a portion of the nanoparticles include ligands attached to an outer surface thereof, the ligands are selected to be chemically compatible with the host material.

In certain preferred embodiments, the nanoparticles comprise semiconductor nanocrystals. (Semiconductor nanocrystals are also referred to herein as quantum dots.)

In certain embodiments, the semiconductor nanocrystals include a core comprising a first semiconductor nanocrystalline material and a shell disposed over at least a portion of an outer surface of the core, the shell comprising a second semiconductor nanocrystalline material.

In certain embodiments, at least a portion of the semiconductor nanocrystals includes one or more ligands attached to an outer surface thereof.

In accordance with another aspect of the present invention, there is provided a powder comprising a plurality of particles in accordance with the invention.

In certain embodiments, the powder has a predetermined particle size distribution. A predetermined particles size distribution can be achieved by screening or by other techniques readily ascertainable by one of ordinary skill in the relevant art.

In certain embodiments, two or more populations of particles are included in the powder, wherein at least one population of particles includes nanoparticles that emit light at a wavelength that is distinct from that emitted by nanoparticles included in another population of particles.

In accordance with another aspect of the present invention, there is provided a formulation comprising one or more particles in accordance with the invention and a solid or liquid medium.

In certain embodiments, the particles are present in the formulation in an amount of at least about 0.1 weight percent based on the weight of the medium. In certain embodiments, the particles are present in the formulation in an amount of at least about 0.1 to about 75 weight percent based on the weight of the medium. In certain embodiments, the particles are present in the formulation in an amount of at least about 0.1 to about 50 weight percent based on the weight of the medium. In certain embodiments, the particles are present in the formulation in an amount of at least about 0.1 to about 25 weight percent based on the weight of the medium. In certain embodiments, the particles are present in the formulation in an amount of at least about 0.1 to about 10 weight percent based on the weight of the medium. In certain embodiments, the particles are present in the formulation in an amount of at least about 0.1 to about 5 weight percent based on the weight of the medium. In certain embodiments, the particles are present in the formulation in an amount of at least about 0.1 to about 2.5 weight percent based on the weight of the medium. In certain embodiments, the particles are present in the formulation in an amount of at least about 0.1 to about 2 weight percent based on the weight of the medium. In certain embodiments, the particles are present in the formulation in an amount of at least about 0.1 to about 1 weight percent based on the weight of the medium. Other concentrations of particles in the medium may be determined to be useful or desirable.

In certain embodiments, the medium comprises a monomer, polymer, resin, film forming composition, and/or mixtures including at least one of the foregoing.

In certain embodiments, the medium comprises a mixture including one or more monomers, polymers, and/or resins.

In certain embodiments, the formulation further includes one or more additives.

In certain embodiments, the one or more additives can include a colorant, a scatterer, a binder, a surfactant, a UV absorber, and/or a mixture of one or more thereof.

Additives and amounts thereof can be selected based on the intended end-use application. Such additives and amounts can be readily ascertained by one of ordinary skill in the relevant art.

In accordance with another aspect of the present invention there is provided a film prepared from a formulation in accordance with the invention.

In certain embodiments, the film further comprises a monomer, polymer, resin, film forming composition, and/or mixtures of the foregoing.

In certain embodiments, a film further includes one or more additives.

In certain embodiments, the one or more additives can include a colorant, a scatterer, a binder, a surfactant, a UV absorber, and/or a mixture of one or more thereof.

Additives and amounts thereof can be selected based on the intended end-use application. Such additives and amounts can be readily ascertained by one of ordinary skill in the relevant art.

In accordance with another aspect of the present invention there is provided a coating comprising a formulation in accordance with the invention.

In accordance with another aspect of the present invention, there is provided a composition comprising one or more particles in accordance with the invention.

In certain embodiments, the one or more particles are dispersed in a second host material.

In certain embodiments, the second host material comprises a polymer.

In certain embodiments, the second host material comprises a monomer.

In certain embodiments, the second host material comprises a resin.

In certain embodiments, the second host material comprises a monomer, polymer, resin, and/or mixtures including at least one of the foregoing.

In accordance with another aspect of the present invention, there is provided a method of preparing encapsulated nanoparticles comprising dispersing nanoparticles in a host material, providing particles comprising nanoparticles dispersed in the host material, and forming a coating over at least a portion of the outer surface of at least a portion of the particles.

Examples of host materials include those provided above and elsewhere herein.

The coating preferably comprises a coating material comprising a resin having low oxygen permeability.

Examples of such resins include, but are not limited to, a polyvinyl alcohol compound and a polyvinylidene dichloride compound.

Such resin can be substituted or unsubstituted.

In certain embodiments, the coating comprises a polyvinyl alcohol compound.

The polyvinyl alcohol compound can optionally include one or more substituent groups, which can be the same or different.

In certain embodiments, the polyvinyl alcohol compound comprises polyvinyl alcohol (PVA).

The polyvinyl alcohol can optionally include one or more substituent groups, which can be the same or different.

In certain embodiments, the polyvinyl alcohol compound comprises poly (ethylenevinyl) alcohol (EVA).

The poly (ethylenevinyl) alcohol can optionally include one or more substituent groups, which can be the same or different.

In certain embodiments, the coating comprises polyvinylidene dichloride,

The polyvinylidene dichloride can optionally include one or more substituent groups, which can be the same or different.

In certain embodiments, the method of preparing encapsulated nanoparticles comprises forming particles comprising nanoparticles dispersed in the host material, forming a layer including coating material over at least a portion of the outer surface of at least a portion of the particles in a liquid medium by rendering the coating material insoluble, and cross-linking the coating material to form the coating.

The layer including coating material can be formed, for example, by adjusting the temperature to reduce solubility of the coating material, adjusting the ionic strength of the liquid medium, and/or adjusting the polarity of the liquid medium to precipitate the coating material on at least a portion of the particles. Preferably such precipitation step is carried out in a controlled manner.

Other techniques may be useful or desirable for forming a layer of coating material on a particle.

The foregoing, and other aspects and embodiments described herein and contemplated by this disclosure all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

Figure 1:
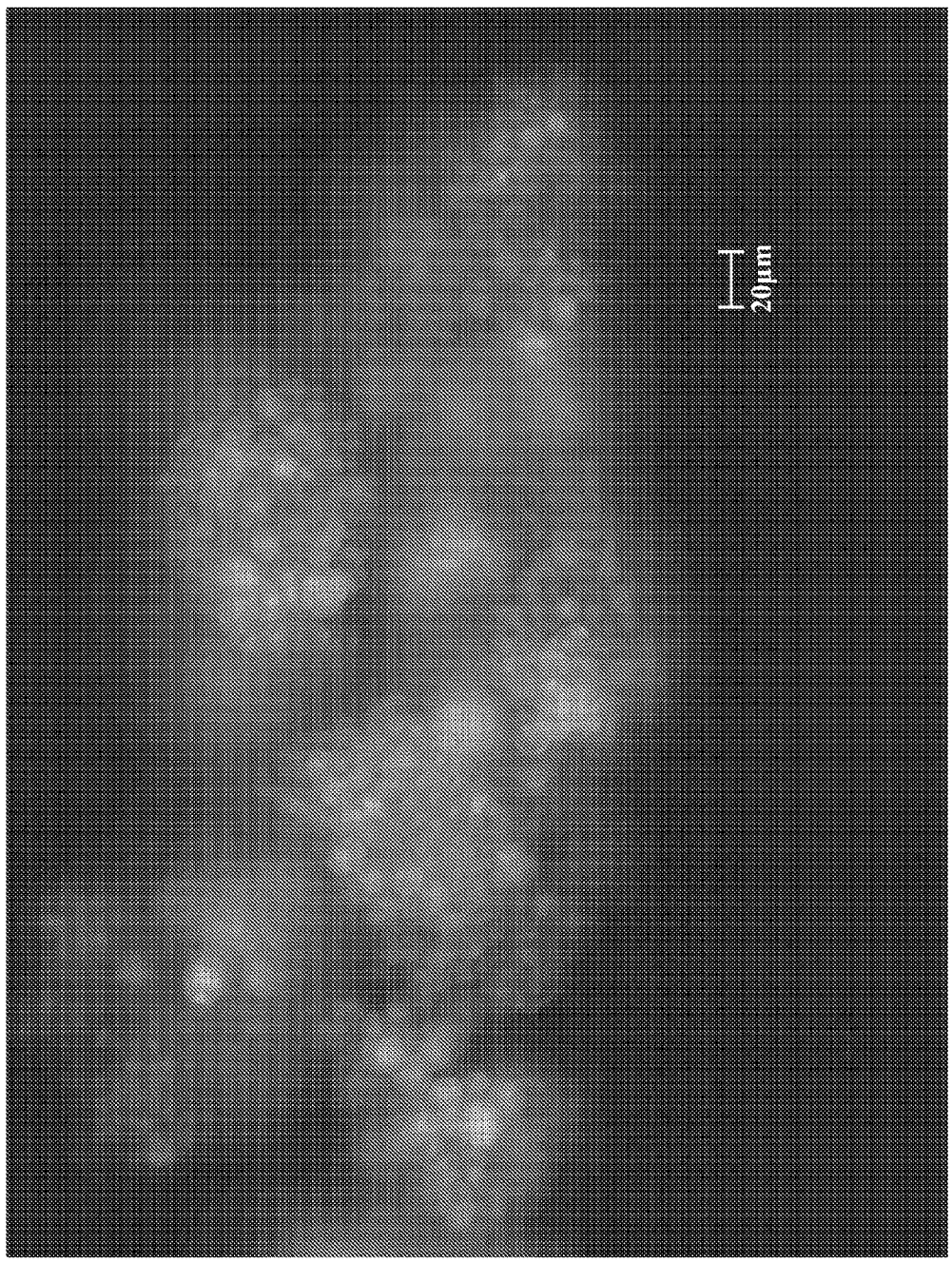
FIG. 1 depicts a step in a preparation of an example of an embodiment of the invention described in the Example.

For a better understanding to the present invention, together with other advantages and capabilities thereof, reference is made to the following disclosure and appended claims in connection with the above-described drawings.

DESCRIPTION OF THE INVENTION

More particularly, the present invention relates to a particle comprising nanoparticles included within a host material wherein the particle includes a coating over at least a portion of the outer surface of the particle. The present invention also relates to powders, formulations, compositions, and coatings including same, uses thereof, and methods.

In accordance with one aspect of the present invention there is provided a particle comprising nanoparticles included in a host material, wherein the particle includes a coating over at least a portion of the outer surface of the particle.

Preferably the coating covers all or substantially all of the outer surface of the particle.

The coating preferably comprises a coating material comprising a resin having low oxygen permeability.

Examples of such resins include, but are not limited to, a polyvinyl alcohol compound and a polyvinylidene dichloride compound.

Such resin can be substituted or unsubstituted.

In certain embodiments, the coating comprises a polyvinyl alcohol compound.

The polyvinyl alcohol compound can optionally include one or more substituent groups, which can be the same or different.

In certain embodiments, the polyvinyl alcohol compound comprises polyvinyl alcohol (PVA).

The polyvinyl alcohol can optionally include one or more substituent groups, which can be the same or different.

In certain embodiments, the polyvinyl alcohol compound comprises poly (ethylenevinyl) alcohol (EVA).

The poly (ethylenevinyl) alcohol can optionally include one or more substituent groups, which can be the same or different.

In certain embodiments, the coating comprises polyvinylidene dichloride.

The polyvinylidene dichloride can optionally include one or more substituent groups, which can be the same or different.

The coating can represent at least 0.1 weight percent of the coated particle. For example, the coating can represent from about 0.1 to about 10 weight percent of the coated particle, from about 0.1 to about 5 weight percent of the coated particle, from about 0.1 to about 3.5 weight percent of the coated particle, from about 0.1 to about 2.5 weight percent of the coated particle. Other coating concentrations outside these ranges may also be determined to be useful or desirable.

The coating can have a thickness of at least 0.1 micron. For example, the coating can have a thickness in a range from about 0.1 to about 10 microns, in a range from about 0.1 to about 5 microns.

Other coating thicknesses outside these ranges may also be determined to be useful or desirable.

In certain embodiments, the nanoparticles can have light-emissive properties. In certain embodiments, the nanoparticles comprise semiconductor nanocrystals. Nanoparticles and semiconductor nanocrystals are discussed further below.

In certain embodiments, the nanoparticles can include one or more ligands attached to the outer surface thereof.

Preferably the host material comprises a solid material. In certain embodiments, the host material can be selected to provide environmental stability to the nanoparticles. For example, a preferred host material can have characteristics which protect the nanoparticles included therein from environmental factors that can adversely affect the nanoparticles. Examples of such factors include, without limitation, oxygen, water, etc.

In certain embodiments, the host material comprises a polymer.

In certain preferred embodiments, the host material comprises a polyacrylate.

In certain embodiments, the host material comprises a polymethacrylate.

In certain embodiments, the host material comprises a polylaurylmethacrylate.

In certain embodiments, the host material comprises a monomer.

In certain embodiments, the host material comprises a resin.

In certain embodiments, the host material comprises one or more monomers, polymers, and/or resins.

Examples of polymers and resins include, for example and without limitation, polyethylene, polypropylene, polystyrene, polyethylene oxide, polysiloxane, polyphenylene, polythiophene, poly (phenylene-vinylene), polysilane, polyethylene terephthalate and poly (phenylene-ethynylene), polymethylmethacrylate, polylaurylmethacrylate, polycarbonate, epoxy, and other epoxies.

Other polymers and resins can be readily ascertained by one of ordinary skill in the relevant art.

Examples of monomers include, for example and without limitation, monomer precursors for the above listed polymer examples.

Additional examples of monomers include, but are not limited to, allyl methacrylate, benzyl methylacrylate, 1,3-butanediol dimethacrylate, 1,4-butanediol dimethacrylate, butyl acrylate, n-butyl methacrylate, ethyl methacrylate, 2-ethyl hexyl acrylate, 1,6-hexanediol dimethacrylate, 4-hydroxybutyl acrylate, hydroxyethyl acrylate, 2-hydroxyethyl methacrylate, 2-hydroxypropyl acrylate, isobutyl methacrylate, lauryl methacrylate, methacrylic acid, methyl acrylate, 2,2,3,3,4,4,5,5-octafluoropentyl acrylate, pentaerythritol triacrylate, 2,2,2-trifluoroethyl 2-methylacrylate, trimethylolpropane triacrylate, acrylamide n,n-methylene-bisacrylamide phenyl acrylate, and divinyl benzene.

For those monomers that are photo-polymerizable, a photoinitiator species can be included with the monomer to enable the polymerization process. Effectively any chemical that can produce free-radicals in a fluidic monomer as a result of illumination absorption can be employed as the photoinitiator species. There are in general two classes of photoinitiators. In the first class, the chemical undergoes unimolecular bond cleavage to yield free radicals. Examples of such photoinitiators include benzoin ethers, benzil ketals, a-dialkoxyacetophenones, a-amino-alkylphenones, and acylphosphine oxides. The second class of photoinitiators is characterized by a bimolecular reaction where the photoinitiator reacts with a coinitiator to form free radicals. Examples of such are benzophenones/amines, thioxanthones/amines, and titanocenes (vis light).

A non-exhaustive listing of examples of photoinitiators that may be useful with a photo-polymerizable monomer for particle preparation include the following from CIBA: IRGACURE 184 (1-hydroxy-cyclohexyl-phenyl-ketone), DAROCUR 1173 (2-hydroxy-2-methyl-1-phenyl-1-propanone), IRGACURE 2959 (2-hydroxy-1-[4-(2-hydroxyethoxy)phenyl]-2-methyl-1-propanone), DAROCUR MBF (Methylbenzoylformate), IRGACURE 754 (oxy-phenyl-acetic acid 2-[2 oxo-2 phenyl-acetoxy-ethoxy]-ethyl ester and oxy-phenyl-acetic 2-[2-hydroxy-ethoxy]-ethyl ester), IRGACURE 651 Alpha, (alpha-dimethoxy-alpha-phenylacetophenone), IRGACURE 369 (2-Benzyl-2-(dimethylamino)-1-[4-(4-morpholinyl)phenyl]-1-butanone), IRGACURE 907 (2-methyl-1-[4-(methylthio)phenyl]-2-(4-morpholinyl)-1-propanone), DAROCUR TPO (diphenyl(2,4,6-trimethylbenzoyl)phosphine oxide), IRGACURE 819 (phosphine oxide, phenyl bis(BAPO) (2,4,6-trimethyl benzoyl)), IRGACURE 784 (bis(eta 5-2,4-cyclopentadien-1-yl)Bis[2,6-difluoro-3-(1H-pyrrol-1-yl)phenyl]titanium), IRGACURE 250 (iodonium, (4-methyl phenyl)[4-(2-methylpropyl)phenyl]-hexafluorophosphate(1-).)

When used, a photoinitiator is included in at least an amount effective to enable the polymerization process.

In certain embodiments, up to about 5 weight percent photoinitiator is included in the mixture to be polymerized. In certain embodiments, up to about 4 percent photoinitiator is included in the mixture to be polymerized. In certain embodiments, up to about 3 percent photoinitiator is included in the mixture to be polymerized. In certain embodiments, up to about 2 percent photoinitiator is included in the mixture to be polymerized. In certain embodiments, about 1 weight percent photoinitiator can be preferred.

Other amounts of photoiniator outside the above ranges may be determined to be useful or desirable.

In certain embodiments, the host material comprises a mixture including one or more monomers, polymers, and/or resins.

In certain embodiments, the host material comprises an inorganic material, such as metal oxide (including, but not limited to, silica or titania).

Examples of host materials for inclusion in particles also include hydrocarbon wax, which is available in different molecular weight versions. Low molecular weight versions are called paraffin wax. Fischer-Tropsch wax is an example of a medium molecular weight version. Polyethylene wax is an example of a high molecular weight version. Melting points can range from 50° C. to 130° C. Straight chain hydrocarbon waxes will be very compatible with nanoparticles including one or more ligands comprising a straight chain alkane ligand. Above certain molecular weight, these waxes are insoluble in most solvents. Lower molecular weight chains are preferred host materials for nanoparticles comprising semiconductor nanocrystals. (Higher molecular weight chains can be more brittle which can make particle size reduction easier.) The index of refraction of these waxes generally is in a range from 1.51 to 1.54, similar to the 1.49 value for PMMA. It is uncolored to milky white. While polyethylene wax is less than an optimum $O_2$ barrier, in certain uses it is preferred because it is not biodegradable and it may be resistant to the liquids and/or components included in the formulation.

Other waxes can be used as host materials, and there are many methods useful to obtain the desired particle size.

In certain embodiments, solid waxes are used as host materials. In certain embodiments, semi-solid waxes are used as host materials.

In certain embodiments, the host material can be optically transparent.

In certain embodiments of the present invention, there is provided a particle comprising a host material including nanoparticles dispersed therein. In certain embodiments, the nanoparticles are dispersed throughout the host material. In certain embodiments, the nanoparticles are substantially uniformly dispersed throughout the host material. In certain embodiments, the nanoparticles are dispersed throughout the particle. In certain embodiments, the nanoparticles are substantially uniformly dispersed throughout the particle.

In certain embodiments, the particle can have a size in a range from about 0.01 to about 100 microns. In certain embodiments, the particle can have a size in a range from about 0.01 to about 80 microns. In certain embodiments, the particle can have a size in a range from about 0.01 to about 60 microns. In certain embodiments, the particle can have a size in a range from about 0.01 to about 50 microns. In certain embodiments, the particle can have a size in a range from about 0.01 to about 40 microns. In certain embodiments, the particle can have a size in a range from about 0.01 to about 20 microns. In certain embodiments, the particle can have a size in a range from about 0.01 to about 10 microns. In certain embodiments, the particle can have a size in a range from about 0.5 to about 50 microns. In certain embodiments, the particle can have a size in a range from about 0.5 to about 30 microns. In certain embodiments, the particle can have a size in a range from about 0.5 to about 20 microns. Particles in accordance with certain embodiments of the invention that are micron sized can facilitate inclusion of nanoparticles in formulations, other compositions, processes, and applications, while avoiding the handling of nano-sized materials.

The concentration of the nanoparticles in the host material or particle can be varied.

In certain embodiments, the nanoparticles can be included in the host material in an amount of at least about 0.001 weight percent. In certain embodiments, the nanoparticles can be included in the host material in an amount in a range from about 0.001 to about 25 weight percent. In certain embodiments, the nanoparticles can be included in the host material in an amount in a range from about 1 to about 10 weight percent. In certain embodiments, the nanoparticles can be included in the host material in an amount in a range from about 0.001 to about 5 weight percent. In certain embodiments, the nanoparticles can be included in the host material in an amount in a range from about 0.001 to about 2.5 weight percent. In certain embodiments, the nanoparticles can be included in the host material in an amount in a range from about 0.01 to about 2 weight percent.

Other concentrations of nanoparticles in the host material may be determined to be useful or desirable.

In accordance with another embodiment of the invention, there is provided a powder comprising a plurality of particles in accordance with the present invention.

In certain embodiments, the powder has a predetermined particle size distribution.

A predetermined particles size distribution can be achieved by screening or by other techniques readily ascertainable by one of ordinary skill in the relevant art.

In another embodiment of the invention, there is provided a formulation comprising a plurality of particles in accordance with the present invention.

In certain embodiments, the formulation can further comprise a liquid.

The liquid can be aqueous or non-aqueous.

The liquid can be polar or non-polar.

In certain embodiments, a formulation can include one or more monomers, polymers, resins, and/or other film forming compositions.

Examples of polymers and resins include, for example and without limitation, polyethylene, polypropylene, polystyrene, polyethylene oxide, polysiloxane, polyphenylene, polythiophene, poly (phenylene-vinylene), polysilane, polyethylene terephthalate, poly (phenylene-ethynylene), polymethylmethacrylate, polylaurylmethacrylate, polycarbonate, epoxy, and other epoxies.

Other polymers and resins suitable for the formulation end-use application can further be used.

Examples of monomers include, for example and without limitation, monomer precursors for the above listed polymer examples and other monomer examples described herein.

Other examples of monomers, polymers, resins, and/or other film forming compositions listed herein can also be included in a formulation.

In certain embodiments, a formulation can optionally include one or more additives, including, but not limited to, colorants, scatterers, binders, surfactants, defoaming agents, UV absorbers, etc., and/or mixtures of one or more of the foregoing.

Additives and amounts thereof can be selected based on the intended end-use application. Such additives and amounts can be readily ascertained by one of ordinary skill in the relevant art.

In certain embodiments of a formulation including a liquid, the host material preferably has a refractive index that matches, or is approximately the same as, that of the formulation after the liquid is removed.

In certain embodiments, the host matrix included in the particles is insoluble in the liquid and other components of the formulation. In certain embodiments, the host matrix included in the particles is not chemically reactive with any liquid and/or other components of the formulation.

In certain embodiments wherein at least a portion of the nanoparticles includes one or more ligands attached to an outer surface thereof, the host material is selected to be chemically compatible with the ligands.

Encapsulating nanoparticles in a host material can advantageously simplify the processing and/or use of the nanoparticles, e.g., in other formulations, compositions, and other products and end-use applications. For example, preparation of a formulation involving nanoparticles having different compositions can be simplified when the nanoparticles are encapsulated in a host material before inclusion in the formulation. This is particularly the case in embodiments wherein each of the different composition nanoparticles is included in a host material that is the same for each of the different nanoparticles.

In certain embodiments, a formulation of the invention can be used in a paint.

In certain embodiments, a formulation of the invention can be used in an ink.

In accordance with another embodiment of the invention, there is provided a coating comprising particles of the invention.

In certain embodiments, the coating further comprises a one or more monomers, polymers, resins, and/or other film forming compositions. In certain embodiments, a coating can optionally further include one or more additives, including, but not limited to, colorants, scatterers, binders, surfactants, UV absorbers, etc., and/or mixtures of one or more of the foregoing.

Additives and amounts thereof can be selected based on the intended end-use application. Such additives and amounts can be readily ascertained by one of ordinary skill in the relevant art.

Examples of polymers and resins include, for example and without limitation, polypropylene, polystyrene, polyethylene oxide, polysiloxane, polyphenylene, polythiophene, poly (phenylene-vinylene), polysilane, polyethylene terephthalate and poly (phenylene-ethynylene, epoxy polymethylmethacrylates), epoxy, and other epoxies.

Other polymers and resins suitable for the coating end-use application can further be used.

Examples of monomers include, for example and without limitation, monomer precursors for the above listed polymer examples.

Other examples of monomers, polymers, resins, and/or other film forming compositions listed herein can also be included in a coating.

In certain embodiments, a coating can be prepared by applying a formulation in accordance with an embodiment of the invention that includes a liquid to a surface and removing the liquid. In certain embodiments, the liquid can be removed from the applied formulation by evaporation, heating, or other suitable techniques.

In certain embodiments, the formulation can be applied to the surface by screen-printing, contact printing, inkjet printing, gravure coating, roll coating, brush, spray, or other suitable techniques.

In certain embodiments, the coating can be patterned or unpatterned.

In accordance with another embodiment of the invention, there is provided a method for making the above-described particles of the invention. The method comprises providing particles comprising nanoparticles dispersed in the host material, and forming a coating over at least a portion of the outer surface of at least a portion of the particles.

Examples of host materials include those provided above and elsewhere herein.

The coating preferably comprises a coating material comprising a resin having low oxygen permeability.

Examples of such resins include, but are not limited to, a polyvinyl alcohol compound and a polyvinylidene dichloride compound.

Such resin can be substituted or unsubstituted.

In certain embodiments, the coating comprises a polyvinyl alcohol compound.

The polyvinyl alcohol compound can optionally include one or more substituent groups, which can be the same or different.

In certain embodiments, the polyvinyl alcohol compound comprises polyvinyl alcohol (PVA).

The polyvinyl alcohol can optionally include one or more substituent groups, which can be the same or different.

In certain embodiments, the polyvinyl alcohol compound comprises poly (ethylenevinyl) alcohol (EVA).

The poly (ethylenevinyl) alcohol can optionally include one or more substituent groups, which can be the same or different.

In certain embodiments, the coating comprises polyvinylidene dichloride.

The polyvinylidene dichloride can optionally include one or more substituent groups, which can be the same or different.

In certain embodiments, the method of preparing encapsulated nanoparticles comprises forming particles comprising nanoparticles dispersed in the host material, forming a layer including coating material over at least a portion of the outer surface of at least a portion of the particles in a liquid medium by rendering the coating material insoluble, preferably in a controlled manner, and cross-linking the coating material to form the coating.

In certain embodiments, the layer including coating material can be formed by adjusting the temperature, adjusting the ionic strength of the liquid medium, and/or adjusting the polarity of the liquid medium to precipitate the coating material on at least a portion of the particles in a controlled manner.

The liquid medium can comprise water.

The liquid medium can comprise a polar organic solvent, which can be readily selected by the skilled article.

In certain embodiments, quantum dots are dispersed in a mixture of one or more monomers and a photoinitiator. Optionally, two or more different types of quantum dots with different emissive properties can be included. The mixture can further include a cross-linker. (A cross-linker can be included in an amount up to about 25 percent by weight; in certain embodiments cross-linker can be included in an amount from about 15 to about 20 weight percent.) The mixture may also further include a surfactant, preferably in an amount from about 0.01 to about 5 weight percent surfactant based on the weight of the liquid medium in which the mixture is further processed. Cross-linking agents and surfactants are well known classes of reagents. Selection of one or more cross-linking agents and/or surfactants for inclusion in the mixture can be readily made by one or ordinary skill in the relevant art. Such selection may be influenced by the composition of other materials included therein. Other concentrations of the various components in the mixture may also be determined to be useful or desirable. Other additives, e.g., but not limited to, those described herein, can further optionally be included. The mixture is then dispersed in a solution of the coating material in water and/or other polar organic solvent with high shear, e.g., using a rotor-stator, disperser to generate microspheres. The microspheres are then quickly photo-polymerized to generate solid, cross-linked microspheres containing the quantum dots. The solution is then treated to cause the coating material to precipitate onto the particle to form a coating on at least a portion of the outer particle surface. The precipitated coating can thereafter be fixed and dried.

For example, with a coating material comprising PVA, the reaction solution can be treated by raising the ionic strength to the cloud point of the PVA using sodium sulfate and increasing temperature which causes the PVA to precipitate around the particles. This PVA layer can then be fixed (e.g., with a cross-linker (e.g., sodium borate)) and the resulting gel is dehydrated in solvent and dried to a final multicoated quantum dot-containing particle or pigment.

In one example of a preferred embodiment, quantum dots are dispersed in a mixture of acrylic monomers and cross-linking agents with a photosensitizer (also referred to herein as a photoinitiator). A surfactant may further be included.

The mixture is then dispersed in a solution of the desired coating material (e.g., but not limited to, polyvinyl alcohol (PVA)) preferably with high shear, e.g., using a rotor-stator, disperser to generate microspheres. The microspheres are then quickly photo-polymerized to generate solid, cross-linked microspheres containing the quantum dots.

The reaction solution is then treated to precipitate the coating material onto particles. Such treatments can comprise raising the ionic strength to the cloud point of the coating material (e.g., PVA) using an ionic salt (e.g., an inorganic salt such as sodium sulfate) and increasing temperature which causes the coating material to precipitate around the particles. This layer of coating material (e.g., PVA layer) is then fixed (e.g., with a cross-linker (e.g., sodium borate)) and the resulting gel is dehydrated in solvent and dried to a final coated particle including quantum dots.

A particle in accordance with the invention can be dispersed in a formulation appropriate for the desired end-use application thereof.

For example, for a paint, a plurality of particles in accordance with the invention can be dispersed in an acrylic base coat to make a paint having improved environmental stability.

Various alcohols, monomers, polymers, resins, and other compounds or materials mentioned herein that include an organic portion can optionally be substituted, e.g., include one or more substituent groups, which can be the same or different.

Nonlimiting examples of substituent groups include organic groups and inorganic groups. Examples of organic groups include, but are not limited to, an aliphatic group, a cyclic organic group, or an organic compound having an aliphatic portion and a cyclic portion. An organic group may further be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hindrance of a substituted organic group increases, the number of organic groups may be diminished.

When the organic group is substituted, it may contain any functional group. Examples include, but are not limited to, OR, COR, COOR, OCOR, COONa, COOK, COO$^-$NR$_4^+$, halogen, CN, NR$_2$, SO$_3$H, SO$_3$Na, SO$_3$K, SO$_3^-$NR$_4^+$, NR(COR), CONR$_2$, NO$_2$, PO$_3$H$_2$, PO$_3$HNa, PO$_3$Na$_2$, N=NR, NR$_3^+$X$^-$, and PR$_3^+$X$^-$. R can independently be hydrogen, C$_1$-C$_{20}$ alkyl (branched or unbranched) or aryl. The integer n can range, e.g., from 1-8 and preferably from 2-4. The anion X$^-$ can be a halide or an anion that can be derived from a mineral or organic acid.

Another example set of organic groups which may be substituents are organic groups substituted with an ionic or an ionizable group as a functional group. An ionizable group is one which is capable of forming an ionic group in the medium or host material of use. The ionic group may be an anionic group or a cationic group and the ionizable group may form an anion or a cation. Ionizable functional groups forming anions include, for example, acidic groups or salts of acidic groups. The organic groups, therefore, can include, e.g., groups derived from organic acids.

Other substituent groups may also be determined to be useful or desirable.

Light-emissive nanoparticles can confine electrons and holes and have a photoluminescent property to absorb light and re-emit different wavelength light. Color characteristics of emitted light from light-emissive nanoparticles depend on the size and chemical composition of the nanoparticles.

In various embodiments and aspects of the inventions described herein, a particle can comprise light-emissive nanoparticles that include at least one type of light-emissive nanoparticle with respect to chemical composition and size. The type(s) of light-emissive nanoparticles included in various aspects or embodiments of the inventions contemplated by this disclosure are determined by the wavelength of light to be converted and the wavelengths of the desired light output. In certain embodiments, two or more types of light-emissive nanoparticles can be used that emit light at the same or different wavelengths.

In certain embodiments, light-emissive nanoparticles preferably include a shell and/or a ligand on a surface thereof. A shell and/or ligand can serve to passivate non-radiative defect sites, and to prevent agglomeration or aggregation to overcome the Van der Waals binding force between the nanoparticles. In certain embodiments, the ligand preferably comprises a material having an affinity for the host material in which light-emissive nanoparticles are included. As discussed herein, in certain embodiments, a shell comprises an inorganic shell. Ligands and shells are further discussed below.

In certain embodiments, a particle of the invention can include nanoparticles selected to emit at a predetermined wavelength or wavelength band for the desired color upon absorption of excitation light.

In certain embodiments, a particle of the invention can include a mixture of two or more nanoparticles, each of which is selected to emit at a predetermined wavelength or wavelength band which is distinct from that of the other(s) when excited by optical energy from one or more light sources for the desired light output.

Particles, powders, compositions, formulations and coatings taught herein can be useful for altering the wavelength of at least a portion of light emitted from an excitation light source.

In certain embodiments, nanoparticles have an average particle size in a range from about 1 to about 1000 nanometers (nm), and preferably in a range from about 1 to about 100 nm. In certain embodiments, nanoparticles have an average particle size in a range from about 1 to about 20 nm. In certain embodiments, nanoparticles have an average particle size in a range from about 1 to about 10 nm.

In certain embodiments, a nanoparticle with light-emissive properties comprises a semiconductor nanocrystal. In certain embodiments, a semiconductor nanocrystal has an average particle size in a range from about 1 to about 20 nm, and preferably from about 1 to about 10 nm.

The semiconductor forming the semiconductor nanocrystals can comprise a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, an alloy including any of the foregoing, and/or a mixture including any of the foregoing, including ternary and quaternary mixtures or alloys. A non-limiting list of examples include ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

Examples of the shape of semiconductor nanocrystals and other nanoparticles can include sphere, rod, disk, other shapes, or mixtures thereof.

One example of a method of manufacturing a semiconductor nanocrystal is a colloidal growth process, Colloidal growth occurs by injection an M donor and an X donor into a hot coordinating solvent. One example of a preferred method for preparing monodisperse semiconductor nanocrystals comprises pyrolysis of organometallic reagents, such as dimethyl cadmium, injected into a hot, coordinating solvent. This permits discrete nucleation and results in the controlled growth of macroscopic quantities of semiconductor nanocrystals. The injection produces a nucleus that can be grown in a controlled manner to form a semiconductor nanocrystal. The reaction mixture can be gently heated to grow and anneal the semiconductor nanocrystal. Both the average size and the size distribution of the semiconductor nanocrystals in a sample are dependent on the growth temperature. The growth temperature necessary to maintain steady growth increases with increasing average crystal size. The semiconductor nanocrystal is a member of a population of semiconductor nanocrystals. As a result of the discrete nucleation and controlled growth, the population of semiconductor nanocrystals that can be obtained has a narrow, monodisperse distribution of diameters. The monodisperse distribution of diameters can also be referred to as a size. Preferably, a monodisperse population of particles includes a population of particles wherein at least about 60% of the particles in the population fall within a specified particle size range. A population of monodisperse particles preferably deviate less than 15% rms (root-mean-square) in diameter and more preferably less than 10% rms and most preferably less than 5%.

In certain embodiments, nanoparticles can comprise semiconductor nanocrystals including a core comprising a first semiconductor material and a shell comprising a second semiconductor material, wherein the shell is disposed over at least a portion of a surface of the core. A semiconductor nanocrystal including a core and shell is also referred to as a "core/shell" semiconductor nanocrystal.

For example, the semiconductor nanocrystal can include a core having the formula MX, where M can be cadmium, zinc, magnesium, mercury, aluminum, gallium, indium, thallium, or mixtures thereof, and X can be oxygen, sulfur, selenium, tellurium, nitrogen, phosphorus, arsenic, antimony, or mixtures thereof. Examples of materials suitable for use as semiconductor nanocrystal cores include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

The shell can be a semiconductor material having a composition that is the same as or different from the composition of the core. The shell comprises an overcoat of a semiconductor material on a surface of the core semiconductor nanocrystal can include a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, alloys including any of the foregoing, and/or mixtures including any of the foregoing, including ternary and quaternary mixtures or alloys. Examples include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing. For example, ZnS, ZnSe or CdS overcoatings can be grown on CdSe or CdTe semiconductor nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating may comprise one or more layers. The overcoating comprises at least one semiconductor material which is the same as or different from the composition of the core. Preferably, the overcoating has a thickness from about one to about ten monolayers. An overcoating can also have a thickness greater than ten monolayers. In certain embodiments, more than one overcoating can be included on a core.

In certain embodiments, the surrounding "shell" material can have a band gap greater than the band gap of the core material. In certain other embodiments, the surrounding shell material can have a band gap less than the band gap of the core material.

In certain embodiments, the shell can be chosen so as to have an atomic spacing close to that of the "core" substrate. In certain other embodiments, the shell and core materials can have the same crystal structure.

Examples of semiconductor nanocrystal (core)shell materials include, without limitation: red (e.g., (CdSe)ZnS (core) shell), green (e.g., (CdZnSe)CdZnS (core)shell, etc.), and blue (e.g., (CdS)CdZnS (core)shell.

The narrow size distribution of the semiconductor nanocrystals allows the possibility of light emission in narrow spectral widths. Monodisperse semiconductor nanocrystals have been described in detail in Murray et al. (J. Am. Chem. Soc., 115:8706 (1993)); in the thesis of Christopher Murray, "Synthesis and Characterization of II-VI Quantum Dots and Their Assembly into 3-D Quantum Dot Superlattices", Massachusetts Institute of Technology, September, 1995; and in U.S. patent application Ser. No. 08/969,302 for "Highly Luminescent Color-Selective Materials". The foregoing are hereby incorporated herein by reference in their entireties.

The process of controlled growth and annealing of the semiconductor nanocrystals in the coordinating solvent that follows nucleation can also result in uniform surface derivatization and regular core structures. As the size distribution sharpens, the temperature can be raised to maintain steady growth. By adding more M donor or X donor, the growth period can be shortened. The M donor can be an inorganic compound, an organometallic compound, or elemental metal. For example, M can be cadmium, zinc, magnesium, mercury, aluminum, gallium, indium or thallium. The X donor is a compound capable of reacting with the M donor to form a material with the general formula MX. For example, the X donor can be a chalcogenide donor or a pnictide donor, such as a phosphine chalcogenide, a bis(silyl)chalcogenide, dioxygen, an ammonium salt, or a tris(silyl)pnictide. Suitable X donors include dioxygen, bis(trimethylsilyl) selenide (($TMS)_2$Se), trialkyl phosphine selenides such as (tri-noctylphosphine) selenide (TOPSe) or (tri-n-butylphosphine) selenide (TBPSe), trialkyl phosphine tellurides such as (tri-n-octyl phosphine) telluride (TOPTe) or hexapropylphosphorustriamide telluride (HPPTTe), bis(trimethylsilyl)telluride (($TMS)_2$Te), bis(trimethylsilyl)sulfide (($TMS)_2$S), a trialkyl phosphine sulfide such as (tri-noctylphosphine) sulfide (TOPS), an ammonium salt such as an ammonium halide (e.g., $NH_4Cl$), tris(trimethylsilyl)phosphide (($TMS)_3$P), tris(trimethylsilyl)arsenide (($TMS)_3$As), or tris(trimethylsilyl) antimonide (($TMS)_3$Sb). In certain embodiments, the M donor and the X donor can be moieties within the same molecule.

A coordinating solvent can help control the growth of the semiconductor nanocrystal. The coordinating solvent is a compound having a donor lone pair that, for example, has a lone electron pair available to coordinate to a surface of the growing semiconductor nanocrystal. Solvent coordination can stabilize the growing semiconductor nanocrystal. Examples of coordinating solvents include alkyl phosphines, alkyl phosphine oxides, alkyl phosphonic acids, or alkyl phosphinic acids, however, other coordinating solvents, such as pyridines, furans, and amines may also be suitable for the semiconductor nanocrystal production. Additional examples of suitable coordinating solvents include pyridine, tri-n-octyl phosphine (TOP), tri-n-octyl phosphine oxide (TOPO) and trishydroxylpropylphosphine (tHPP), tributylphosphine, tri (dodecyl)phosphine, dibutyl-phosphite, tributyl phosphite, trioctadecyl phosphite, trilauryl phosphite, tris(tridecyl) phosphite, triisodecyl phosphite, bis(2-ethyl hexyl)phosphate, tris(tridecyl)phosphate, hexadecylamine, oleylamine, octadecylamine, bis(2-ethylhexyl)amine, octylamine, dioctylamine, trioctylamine, dodecylamine/laurylamine, didodecylamine tridodecylamine, hexadecylamine, dioctadecylamine, trioctadecylamine, phenylphosphonic acid, hexylphosphonic acid, tetradecylphosphonic acid, octylphosphonic acid, octadecylphosphonic acid, propylenediphosphonic acid, phenylphosphonic acid, aminohexylphosphonic acid, dioctyl ether, diphenyl ether, methyl myristate, octyl octanoate, and hexyl octanoate. In certain embodiments, technical grade TOPO can be used.

In certain embodiments, semiconductor nanocrystals can alternatively be prepared with use of non-coordinating solvent(s).

Size distribution during the growth stage of the reaction can be estimated by monitoring the absorption or emission line widths of the particles. Modification of the reaction temperature in response to changes in the absorption spectrum of the particles allows the maintenance of a sharp particle size distribution during growth. Reactants can be added to the nucleation solution during crystal growth to grow larger crystals. For example, for CdSe and CdTe, by stopping growth at a particular semiconductor nanocrystal average diameter and choosing the proper composition of the semiconducting material, the emission spectra of the semiconductor nanocrystals can be tuned continuously over the wavelength range of 300 nm to 5 microns, or from 400 nm to 800 nm.

The particle size distribution of the semiconductor nanocrystals can be further refined by size selective precipitation with a poor solvent for the semiconductor nanocrystals, such as methanol/butanol as described in U.S. Pat. No. 6,322,901. For example, semiconductor nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected semiconductor nanocrystal population preferably has no more than a 15% rms deviation from mean diameter, more preferably 10% rms deviation or less, and most preferably 5% rms deviation or less.

In certain embodiments, semiconductor nanocrystals preferably have ligands attached thereto.

In certain embodiment, the ligands can be derived from the coordinating solvent used during the growth process.

In certain embodiments, the surface can be modified by repeated exposure to an excess of a competing coordinating group to form an overlayer.

For example, a dispersion of the capped semiconductor nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the semiconductor nanocrystal, including, for example, phosphines, thiols, amines and phosphates. The semiconductor nanocrystal can be exposed to short chain polymers which exhibit an affinity for the surface and which terminate in a moiety having an affinity for a liquid medium in which the semiconductor nanocrystal is suspended or dispersed. Such affinity improves the stability of the suspension and discourages flocculation of the semiconductor nanocrystal.

More specifically, the coordinating ligand can have the formula:

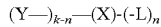

wherein k is 2, 3 4, or 5, and n is 1, 2, 3, 4 or 5 such that k-n is not less than zero; X is O, O—S, O—Se, O—N, O—P, O—As, S, S=O, SO$_2$, Se, Se=O, N, N=O, P, P=O, C=O As, or As=O; each of Y and L, independently, is H, OH, aryl, heteroaryl, or a straight or branched C2-C18 hydrocarbon chain optionally containing at least one double bond, at least one triple bond, or at least one double bond and one triple bond. The hydrocarbon chain can be optionally substituted with one or more C1-4 alkyl, C2-4 alkenyl, C2-4 alkynyl, C1-4 alkoxy, hydroxyl, halo, amino, nitro, cyano, C3-5 cycloalkyl, 3-5 membered heterocycloalkyl, aryl, heteroaryl, C1-4 alkylcarbonyloxy, C1-4 alkyloxycarbonyl, C1-4 alkylcarbonyl, or formyl. The hydrocarbon chain can also be optionally interrupted by —O—, —S—, —N(Ra)—, —N(Ra)—C(O)—O—, —O—C(O)—N(Ra)—, —N(Ra)—C(O)—N(Rb)—, —O—C(O)—O—, —P(Ra)—, or —P(O)(Ra)—. Each of Ra and Rb, independently, is hydrogen, alkyl, alkenyl, alkynyl, alkoxy, hydroxylalkyl, hydroxyl, or haloalkyl. An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyridyl, pyrrolyl, phenanthryl.

A suitable coordinating ligand can be purchased commercially or prepared by ordinary synthetic organic techniques, for example, as described in J. March, Advanced Organic Chemistry.

Other ligands are described in U.S. patent application Ser. No. 10/641,292 for "Stabilized Semiconductor Nanocrystals", filed 15 Aug. 2003, which issued on 9 Jan. 2007 as U.S. Pat. No. 7,160,613, which is hereby incorporated herein by reference in its entirety.

Other examples of ligands include benzylphosphonic acid, benzylphosphonic acid including at least one substituent group on the ring of the benzyl group, a conjugate base of such acids, and mixtures including one or more of the foregoing. In certain embodiments, a ligand comprises 4-hydroxybenzylphosphonic acid, a conjugate base of the acid, or a mixture of the foregoing. In certain embodiments, a ligand comprises 3, 5-di-tert-butyl-4-hydroxybenzylphosphonic acid, a conjugate base of the acid, or a mixture of the foregoing.

Additional examples of ligands that may be useful with the present invention are described in International Application No. PCT/US2008/010651, filed 12 Sep. 2008, of Breen, et al., for "Functionalized Nanoparticles And Method" and International Application No. PCT/US2009/004345, filed 28 Jul. 2009 of Breen et al., for "Nanoparticle Including Multi-Functional Ligand And Method", each of the foregoing being hereby incorporated herein by reference.

The emission from a nanoparticle capable of emitting light (e.g., a semiconductor nanocrystal) can be a narrow Gaussian emission band that can be tuned through the complete wavelength range of the ultraviolet, visible, NIR (700 nm-1400 nm), or infra-red regions of the spectrum by varying the size of the nanoparticle, the composition of the nanoparticle, or both. For example, a semiconductor nanocrystal comprising CdSe can be tuned in the visible region; a semiconductor nanocrystal comprising InAs can be tuned in the infra-red region. The narrow size distribution of a population of nanoparticles capable of emitting light (e.g., semiconductor nanocrystals) can result in emission of light in a narrow spectral range. The population can be monodisperse preferably exhibits less than a 15% rms (root-mean-square) deviation in diameter of such nanoparticles, more preferably less than 10%, most preferably less than 5%. Spectral emissions in a narrow range of no greater than about 75 nm, preferably 60 nm, more preferably 40 nm, and most preferably 30 nm full width at half max (FWHM) for such nanoparticles that emit in the visible can be observed. IR-emitting nanoparticles can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of the light-emitting nanoparticle diameters decreases.

For example, semiconductor nanocrystals can have high emission quantum efficiencies such as greater than 10%, 20%, 30%, 40%, 50%, 60%, 70%, 80%, or 90%.

The narrow FWHM of semiconductor nanocrystals can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of semiconductor nanocrystals will emit light spanning a narrow range of wavelengths. A pattern including more than one size of semiconductor nanocrystal can emit light in more than one narrow range of wavelengths. The color of emitted light perceived by a viewer can be controlled by selecting appropriate combinations of semiconductor nanocrystal sizes and materials. The degeneracy of the band edge energy levels of semiconductor nanocrystals facilitates capture and radiative recombination of all possible excitons.

Transmission electron microscopy (TEM) can provide information about the size, shape, and distribution of the semiconductor nanocrystal population. Powder X-ray diffraction (XRD) patterns can provide the most complete information regarding the type and quality of the crystal structure of the semiconductor nanocrystals. Estimates of size are also possible since particle diameter is inversely related, via the X-ray coherence length, to the peak width. For example, the diameter of the semiconductor nanocrystal can be measured directly by transmission electron microscopy or estimated from X-ray diffraction data using, for example, the Scherrer equation. It also can be estimated from the UV/Vis absorption spectrum.

Other materials, techniques, methods, applications, and information that may be useful with the present invention are described in, International Application No. PCT/US2007/24320, filed Nov. 21, 2007, of Clough, et al., for "Nanocrystals Including A Group IIIa Element And A Group Va Element, Method, Composition, Device And Other Products" which published as WO2008/133660; International Application No, PCT/US2007/24305, filed Nov. 21, 2007, of Breen, et al., for "Blue Light Emitting Semiconductor Nanocrystal And Compositions And Devices Including Same" which published as WO2008/063652; International Application No. PCT/US2007/24306, filed Nov. 21, 2007, of Ramprasad, for "Semiconductor Nanocrystal And Compositions And Devices Including Same" which published as WO2008/063653; International Application No, PCT/US2007/013152, filed Jun. 4, 2007, of Coe-Sullivan, et al., for "Light-Emitting Devices And Displays With Improved Performance" which published as WO2007/143197; International Application No. PCT/US2007/24750, of Coe-Sullivan, et al., filed Dec. 3, 2007 "Improved Composites And Devices Including Nanoparticles" which published as WO2008/070028; International Application No. PCT/US2007/24310, filed Nov. 21, 2007, of Kazlas, et al., for "Light-Emitting Devices And Displays With Improved Performance" which published as WO2008/063653; International Application No. PCT/US2007/003677, filed Feb. 14, 2007, of Bulovic, et al., for "Solid State Lighting Devices Including Semiconductor Nanocrystals & Methods", U.S. patent application Ser. No. 12/283,609, filed 12 Sep. 2008, of Coe-Sullivan et al., for "Compositions, Optical Component, System Including an Optical Component, Devices, and Other Products", and U.S. Patent Application No. 60/949,306, filed 12 Jul. 2007, of Linton, et al., for "Compositions, Methods For Depositing Nonmaterial, Methods For Fabricating A Device, And Methods For Fabricating An Array Of Devices, U.S. Pat. No. 7,229,690, issued 12 Jun. 2007, of Chan, et al., for "Microspheres Including Nanoparticles", U.S. Pat. No. 7,449,237, issued 11 Nov. 2008, of Chan, et al., for "Microspheres Including Nanoparticles in the Peripheral Region", and International Application No. PCT/US2009/01372, filed 4 Mar. 2009, of John R. Linton, et al, for "Particles Including Nanoparticles, Uses Thereof, and Methods". The disclosures of each of the foregoing listed patent documents are hereby incorporated herein by reference in their entireties.

Particles, powders, formulations, coatings, films, and compositions in accordance with various embodiments of the invention may be incorporated into a wide variety of products and end-use applications, including, but not limited to, inks, paints, coatings, optical films, optical components, flat panel displays, computer monitors, televisions, billboards, lights for interior or exterior illumination and/or signaling, heads up displays, fully transparent displays, flexible displays, laser printers, telephones, cell phones, personal digital assistants (PDAs), laptop computers, digital cameras, camcorders, viewfinders, micro-displays, vehicles, a large area wall, theater or stadium screen, a sign, lamps and various solid state lighting devices.

The present invention will be further clarified by the following non-limiting example(s), which are intended to be exemplary of the present invention.

EXAMPLE

Following describes an example of preparing particles including InP/ZnS Quantum Dots with Octadecylphosphonic Acid (ODPA) and Decylamine ligands in LMA/EGDA acrylic microcapsule via emulsion photopolymerization using Polyvinyl Alcohol as dispersant and protective overcoating.

Materials

Deionized water is used. Lauiyl methacrylate (LMA) (Aldrich Chemical, 96% lot #08118DE) and ethylene glycol diacrylate (EGDA) (Aldrich Chemical, 98% lot #15017PD) are purified by passage through a short plug of activated Alumina in order to remove polymerization inhibitors. After passage through the column, the monomers are kept in a sealed, amber glass vial, refrigerated and used within 24 hours. Esacure KTO 46 photoinitator (Sartomer, lot #2008050005), Sodium Sulfate (Aldrich Chemical, anhydrous) and polyvinyl alcohol (Fluka, 4-98 lot #454084) are used without further purification. All other solvents are reagent grade and used without further purification.

Sodium Sulfate Solution. An Erlenmeyer flask equipped with magnetic stir bar is charged with 800 mL deionized water. 20 g anhydrous sodium sulfate is added slowly to prevent clumping. When solution was clear, it is transferred to a 1 liter volumetric flask and diluted to the mark with deionized water.

Polyvinyl alcohol solution. An Erlenmeyer flask equipped with a magnetic stir bar is charged with 1 L deionized water. The water is heated on a hot plate to 90° C. with stirring. PVA powder is added slowly to prevent clumping. When all of the PVA has been added, solution is heated until clear and free of solids. Hot solution is then gravity filtered through a Whatman medium fluted filter paper into a storage bottle.

Colloidal InP/ZnS core/shell quantum dots including Octadecylphosphonic Acid (ODPA) and Decylamine ligands are dispersed in toluene (7 mL, 21 mg/mL on inorganic basis; 147 mg total inorganics); the quantum dots have an $emission_{max}$=620 nm, quantum yield=68%, absorbance 589 nm, and FWHM=56 nm.

Experimental

Quantum dot/monomer preparation. A 50 mL Schlenk flask equipped with rubber septum and magnetic stirrer is charged with lauryl acrylate (6.08 g, 6.88 mL) and Ethylene glycol diacrylate (1.52 g, 1.39 mL). The InP/ZnS quantum dots in toluene (7 mL, 21 mg/mL on inorganic basis; 147 mg total inorganics) are added via syringe and vacuum is continued until all of the toluene solvent is removed as indicated by system pressure dropping below 500 mtorr. Esacure KTO-46 photoinitiator (0.28 g) is then added to the lauryl acrylate/quantum dot solution and well mixed using a magnetic stirrer.

Emulsion formation & polymerization. A 250 mL jacketed beaker is equipped with a magnetic stir bar and a 450 W Hg light in a cooled quartz sleeve is suspended 4-5 inches above the beaker.

89 mL of the 4% PVA solution is charged to the beaker, stirred and cooled to 6° C. by setting the circulating bath temperature to a 2° C. setpoint. Once the temperature is reached, the monomer/QD solution is added subsurface via syringe creating a suspension of red colored beads. The IKA T25 rotor-stator is then immersed in the suspension and sheared at low speed (8000 rpm) until oil phase on top of reaction solution disappears and is incorporated into emulsion. Rotor stator is allowed to run for 10 minutes at low-medium speed making sure that air entrainment is minimized. After 10 minutes, the rotor-stator is shut off and the lamp is connected to power supply and quickly placed in the quartz photo well. Lamp is ignited and allowed to run for exactly 20 minutes. At the end of 20 minutes, power to the lamp is shut off. Rose colored and cloudy but no visible particles can be seen.

The reaction solution is checked under microscope and 1-10 µm particles are seen which fluoresce under rhodamine filter.

A drop of solution is placed on 100° C. microscope slide and film is allowed to form and heat for 10 minutes. Capsules agglomerate but none burst. Capsules have polymerized.

PVA Overcoating.

Reaction mixture stirs under cooling until temperature again reaches 6° C. 42 mL of the 20% sodium sulfate solution is added at 5 ml/minute using a syringe pump. (This volume has previously been determined to reach the cloud point of 86 mL of a 4% 4-98 PVA solution at 6° C.) After solution addition is complete, the circulating batch setpoint is set to 30° C. and the reaction solution warms up to 25° C. over 20 minutes. FIG. 1 shows gel particles forming in the reaction solution (200× rhodamine filter). (Aqueous PVA solution after addition of sodium sulfate.)

The rotor-stator is again switched on at low speed and the reaction mixture is charged all at once with 5.4 mL of a 1.25% aqueous sodium tetraborate solution which causes immediate gelling of the reaction mixture. All stirring is stopped.

Recovery and Washing of in Microparticles.

The gel is transferred to a 500 mL beaker and 250 mL of methanol is added. The mixture is macerated with the rotor stator (set on low) and allowed to disperse for 30 minutes, during which time the gel broke up and particle size reduction occurred. The mixture is transferred into 250 mL centrifuge bottles and spun at 4000 rpm for 15 minutes. The solids are at the bottom of the tube (tan in color) with a thin white layer above it. The rest of the tube is clear methanol which is decanted.

The solids are transferred to an Erlenmeyer flask and resuspended in 200 mL methanol and allowed to stir for 2 hours and centrifuged again under the same conditions. The solids are once again resuspended in hexanes (200 mL) and allowed to stir overnight. In the following morning, the solid is recovered by centrifugation and once again resuspended in hexanes (200 mL) and allowed to stir for 2 hours. The solids are then recovered on a course glass frit via vacuum filtration, placed in a round bottomed flask and allowed to dry in vacuo. The dried, tan solid is transferred to a jar for storage.

Yield 10.05 g dried solid (88%) based on theoretical 11.47 g: (8.03 g (QD+microcapsules)+3.44 g PVA).

Encapsulated particles are useful for inclusion in formulations for use in paints and coatings.

In certain preferred embodiments, the encapsulated particles are formed using very short polymerization times through the use of photopolymerization. In such embodiments, the combination of highly cross-linked inner shell including a coating (e.g., PVA outer shell) described herein over at least a portion of the outer surface of the particle prevent quantum dot agglomeration as well as provides a water and oxygen barrier layer.

Figure 2:
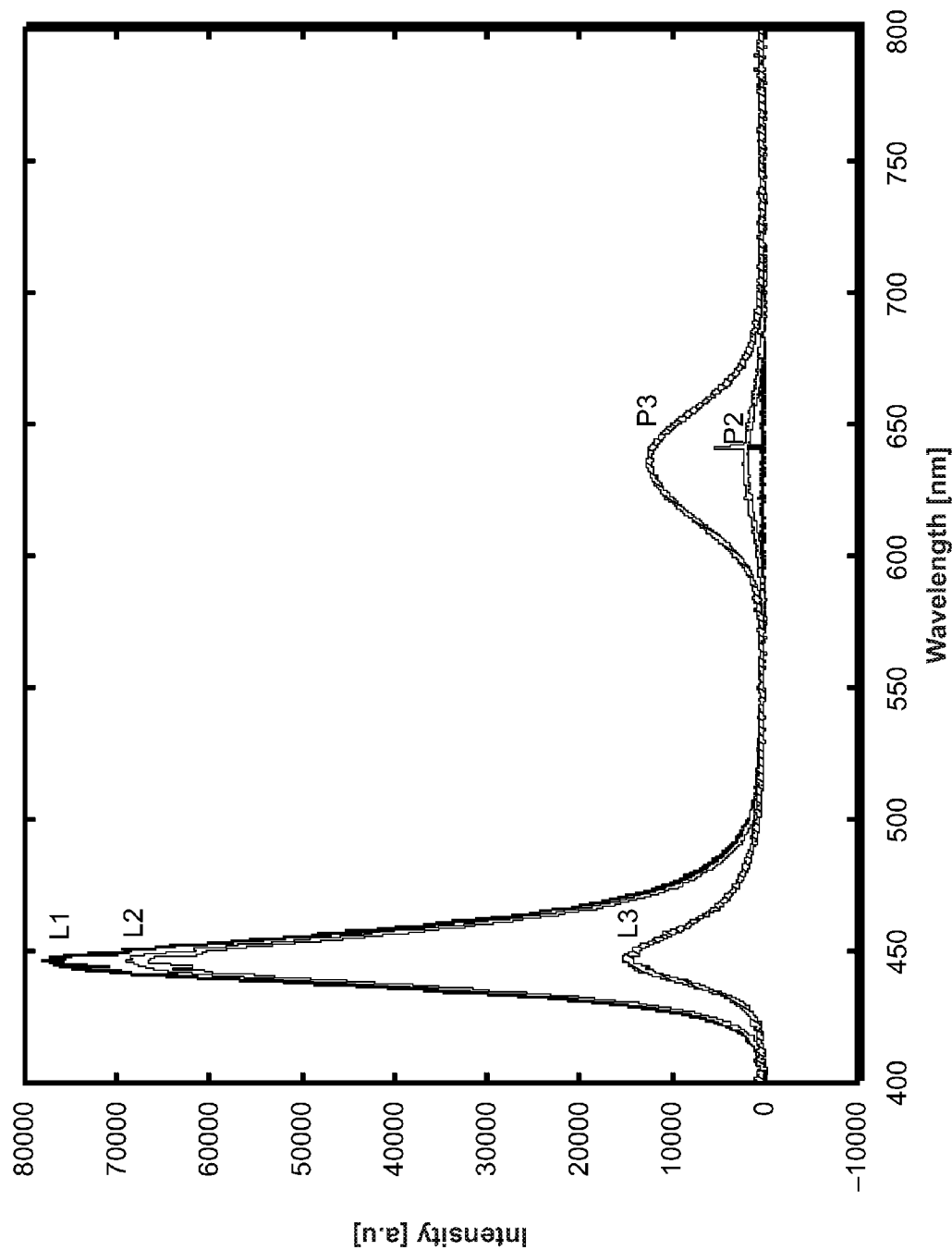
FIG. 2 depicts spectra to illustrate a method for measuring quantum efficiency.

The external photoluminescent (PL) quantum efficiency is generally measured using the method developed by Mello et al. (See Mello et al., Advanced Materials 9(3):230 (1997), which is hereby incorporated by reference in its entirety). The method uses a collimated 450 nm LED source, an integrating sphere and a spectrometer. Three measurements are taken. First, the LED directly illuminates the integrating sphere giving the spectrum labeled L1 below. Next, the PL sample is placed into the integrating sphere so that only diffuse LED light illuminates the sample giving the (L2+P2) spectrum below. Finally, the PL sample is placed into the integrating sphere so that the LED directly illuminates the sample (just off normal incidence) giving the (L3+P3) spectrum below. (See FIG. 2). After collecting the data, each spectral contribution (L's and P's) is computed. L1, L2 and L3 correspond to the sums of the LED spectra for each measurement and P2 and P3 are the sums associated with the PL spectra for 2nd and 3rd measurements. The following equation then gives the external PL quantum efficiency:

$$EQE=[(P3 \cdot L2) \text{ minus } (P2 \cdot L3)]/(L1 \cdot (L2 \text{ minus } L3))$$

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure by reference in their entirety. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A particle comprising nanoparticles having light-emissive properties included in a solid host material, wherein the host material has characteristics which protect the nanoparticles from environmental factors including oxygen and water, wherein the particle includes a coating over at least a portion of the outer surface of the particle and wherein the coating comprises a resin with low oxygen permeability, wherein the coating has a thickness in a range from about 0.1 to about 10 microns.

2. A particle in accordance with claim 1 wherein the resin comprises a polyvinyl alcohol compound, wherein the polyvinyl alcohol compound is substituted or unsubstituted.

3. A particle in accordance with claim 1 wherein the resin comprises polyvinylidene dichloride compound, wherein the polyvinylidene dichloride compound is substituted or unsubstituted.

4. A particle in accordance with claim 1 wherein the coating has a thickness of at least 0.1 micron.

5. A particle in accordance with claim 1 wherein the particle has at least one dimension in the range from about 0.01 μm to about 100 μm.

6. A particle in accordance with claim 1 wherein the particle includes at least about 0.001 weight percent nanoparticles.

7. A particle in accordance with claim 1 wherein the particle includes from about 0.001 to about 25 weight percent nanoparticles.

8. A particle in accordance with claim 1 wherein the host material comprises a polymer.

9. A particle in accordance with claim 1 wherein the host material comprises a wax.

10. A particle in accordance with claim 1 wherein the host material is optically transparent to excitation light used to optically excite the nanoparticles.

11. A particle in accordance with claim 1 wherein the host material is optically transparent to light emitted from the light-emissive nanoparticles.

12. A particle in accordance with claim 11 wherein the host material is optically transparent to light emitted from the light-emissive nanoparticles.

13. A particle in accordance with claim 1 wherein at least a portion of the nanoparticles include a core comprising a first semiconductor material and a shell disposed over at least a portion of an outer surface of the core, the shell comprising a second semiconductor material.

14. A particle in accordance with claim 1 wherein at least a portion of the nanoparticles includes one or more ligands attached to an outer surface thereof.

15. A composition comprising one or more particles in accordance with claim 1 dispersed in a second host material.

16. A composition in accordance with claim 15 wherein the second host material comprises a polymer.

17. A composition in accordance with claim 15 wherein the second host material comprises a monomer.

18. A composition in accordance with claim 15 wherein the second host material comprises a second resin.

19. A particle in accordance with claim 1 wherein the host material comprises polyacrylate.

20. A particle in accordance with claim 1 wherein the host material comprises polymethacrylate.

21. A particle in accordance with claim 1 wherein the host material comprises polylaurylmethacrylate.

22. A particle in accordance with claim 1 wherein the host material comprises an inorganic material.

23. A coating comprising a film prepared from a plurality of particles in accordance with claim 1.

24. A particle in accordance with claim 1 wherein the nanoparticles comprise semiconductor nanocrystals.

25. A particle in accordance with claim 1 wherein the coating covers all of the outer surface of the of the particle.

26. A particle in accordance with claim 1 wherein the host material is highly cross-linked and encapsulates the nanoparticles, and wherein the coating provides a water and oxygen barrier layer covering the outer surface of the particle.

27. A particle in accordance with claim 1 wherein the nanoparticles include two or more types of light-emissive nanoparticles that emit light at the same or different wavelengths.

28. A composition in accordance with claim 15 wherein the host material is highly cross-linked and encapsulates the nanoparticles, and wherein the coating provides a water and oxygen barrier layer covering the outer surface of the particle.

29. A coating comprising a particle comprising nanoparticles having light-emissive properties included in a solid host material, wherein the host material has characteristics which protect the nanoparticles from environmental factors including oxygen and water, wherein the nanoparticles comprise semiconductor nanocrystals, and wherein the particle includes a particle coating over at least a portion of the outer surface of the particle and wherein the particle coating comprises a resin with low oxygen permeability, wherein the particle coating has a thickness in a range from about 0.1 to about 10 microns.

30. A coating in accordance with claim 29 wherein the coating further comprises one or more monomers, polymers, resins, and/or other film forming compositions.

31. A coating in accordance with claim 29 wherein the coating further includes one or more additives.

32. A coating in accordance with claim 31 wherein the one or more additives comprise a colorant, a scatterer, a binder, a surfactant, a UV absorber, and/or a mixture of one or more thereof.

33. A coating in accordance with claim 29 wherein the particle coating covers all of the outer surface of the of the particle.

34. A coating in accordance with claim 29 wherein the host material is highly cross-linked and encapsulates the nanoparticles, and wherein the particle coating provides a water and oxygen barrier layer covering the outer surface of the particle.

35. A coating in accordance with claim 29 wherein the nanoparticles include two or more types of light-emissive nanoparticles that emit light at the same or different wavelengths.

36. A coating in accordance with claim 29 wherein the resin comprises a polyvinyl alcohol compound, wherein the polyvinyl alcohol compound is substituted or unsubstituted.

37. A coating in accordance with claim 29 wherein the resin comprises polyvinylidene dichloride compound, wherein the polyvinylidene dichloride compound is substituted or unsubstituted.

38. A coated particle including a particle comprising nanoparticles having light-emissive properties included in a solid host material, wherein the host material has characteristics which protect the nanoparticles from environmental factors including oxygen and water, wherein the particle has a size in a range from about 0.01 to about 100 microns, and a coating over at least a portion of the outer surface of the particle, the coating comprising a resin with low oxygen permeability, wherein the coating has a thickness of about 10 microns or less.

39. A coated particle in accordance with claim 38 wherein the resin comprises a polyvinyl alcohol compound, wherein the polyvinyl alcohol compound is substituted or unsubstituted.

40. A coated particle in accordance with claim 38 wherein the resin comprises polyvinylidene dichloride compound, wherein the polyvinylidene dichloride compound is substituted or unsubstituted.

* * * * *